Patented Mar. 1, 1938

2,109,947

UNITED STATES PATENT OFFICE 2,109,947

ETHER ACID ESTERS OF HIGHER ALCOHOLS

Clayton Olin North, Charleston, W. Va., assignor, by mesne assignments, to Margaret R. North, Charleston, W. Va.

No Drawing. Application January 27, 1934, Serial No. 708,687

12 Claims. (Cl. 260—103)

This invention relates to a new class of esters of ether acids, useful as plasticizers and to methods of preparing such esters wherein an ether monocarboxylic acid, containing one or more ether groups, is esterified with a primary monohydric alcohol of relatively high molecular weight, containing between 6 and 18 carbon atoms in a straight chain; all as more fully hereinafter set forth and as claimed.

In order to properly plasticize various coating and film-forming materials, such as cellulose nitrate, cellulose acetate and other cellulose esters and ethers or synthetic and natural resins, such materials and the plasticizer must be mutually miscible over a range of temperatures and other conditions. Further, the plasticizer must remain unchanged in the coatings or films on exposure to air if they are to be sufficiently permanent for commercial utilization. If the plasticizer is dissipated or decomposed, the coatings or films become brittle or otherwise deteriorated.

A satisfactory plasticizer for general use must comply with certain exacting requirements; requirements being to a certain extent conflicting. It must have a good solvent power for the ordinary run of plastic material; it must not have any substantial solubility in water and ordinary liquids; it must not be dissipated on exposure to the air or, in other words, it must have a low vapor tension and it should be as chemically inert as possible resisting attack by acids, alkalies and miscellaneous chemicals. In the present invention these requirements are met by providing bodies of a certain structure: a long chain normal alcohol esterified by an acid with a shorter carbon chain and carrying ether groups. For stereochemical, and other reasons, a long chain alcohol esterified by an etherified acid resists hydrolysis and saponification. It is chemically inert, and being a large molecule, it has little vapor tension, while at the same time it happens that the substances here under consideration are liquids or soft plastics having physical properties suitable for plasticization. The fact that the molecule carries an ether group and an ester group renders it miscible with pyroxylin and a variety of other plastics.

The various common esters or ethers or ether-esters, particularly those of relatively low molecular weight or of simple structure, are mostly too volatile. While some of them have relatively high boiling points, nevertheless, their vapor tension at ordinary temperatures is substantial, and when thin films are exposed to the atmosphere, it is sufficient to cause dissipation by evaporation to an undesirable extent. Further these esters are more or less susceptible to hydrolysis, reverting into their component acids and alcohols. Apparently the presence of a plurality of ester groups, or of branched chains, renders the esters more susceptible to this and to other decompositions such a susceptibility is objectionable in a plasticizer. It is frequently encountered in polyesters, such as are obtained from dibasic acids and polyhydric alcohols.

Simply using either an acid or alcohol of high molecular weight or of complex structure to raise the boiling point of an ester, does not of itself solve the problems arising in the preparation of good, commercial plasticizers. The vapor tension is more important than the sheer boiling point while stability, or permanence, is vital. Any decomposition, however slight, is undesirable; it leads to loss of miscibility, accelerated decomposition, etc.

I have found that it is necessary to correlate the acid and alcohol radicles and to provide sufficient ether linkages to secure the proper permanence and balance of properties in the plasticizer. In doing so, I have created a new class of ether-ester compounds, which are advantageous as plasticizers in the commercial arts; they having high solvent power.

The present ether-esters are characterized by containing but one ester group and two or three ether groups, all in the acid part of the ester, and being free of branched aliphatic chains in the alcohol part of the ester, the latter part of the ester carrying an aliphatic straight chain containing between 6 and 18 carbon atoms. Such esters may be represented by the following formula:

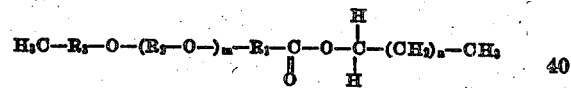

wherein $R_1$ and $R_3$ represents alkylene and phenylene groups, $R_2$ is —$C_2H_4$—, $m$ is 1 to 2 and $n$ is 4 to 16.

By varying the $R_1$ and $R_3$ and the $m$ and $n$ as indicated and within the range given, I may obtain plasticizers having the desired combination of properties (miscibility, vapor pressure, etc.) needed for a given plasticization of particular resins, cellulose ester, etc., for commercial purposes. Examples of the various esters within the above class are given post.

These esters may be prepared from a variety of ether-mono-carboxylic acids and primary monohydric alcohols. The following acids are typical:

1. *n* butoxy acetic acid $C_4H_9-O-CH_2-COOH$ or $H_3C-(CH_2)_3-O-(CH_2)_1-COOH$ 2. (Beta-*n* butoxy ethoxy) acetic acid $C_4H_9-O-CH_2CH_2-O-CH_2-COOH$ or $H_3C-(CH_2)_3-O-[-(CH_2)_2-]_1-CH_2-COOH$ 3. (Beta-*n* butoxy ethoxy) benzoic acid $C_4H_9-O-CH_2CH_2-O-C_6H_4-COOH$ or $H_3C-(CH_2)_3-O-[-(CH_2)_2-O-]_1-C_6H_4-COOH$ 4. (Beta-*n* butoxy ethoxy) propionic acid $C_4H_9-O-CH_2CH_2-O-CH_2CH_2-COOH$ or $H_3C-(CH_2)_3-O-[-(CH_2)_2-O]_1-(CH_2)_2-COOH$ 5. (Beta-(beta-*n* butoxy ethoxy) ethoxy acetic acid $C_4H_9-O-CH_2CH_2-O-CH_2CH_2-O-CH_2-COOH$ or $H_3C-(CH_2)_3-O-[-(CH_2)_2-O-]_2-CH_2-COOH$ The first acid is a mono-ether; the next three acids, di-ethers and the last acid, a tri-ether. They are illustrative of the ether-acids here employed to produce the new class of ether-ester plasticizers represented by the following formula:

$$R-O-(R_2-O-)_m-R_1-\underset{\underset{O}{\parallel}}{C}-O-R_6$$

wherein R is an alkyl group, $R_2$ is an ethylene group, $R_1$ represents alkylene and phenylene groups, $R_6$ is a long chain alkyl radical, having a straight unbroken chain of $CH_2$ groups and containing between 6 and 18 carbon atoms derived from a primary alcohol and *m* is 1 to 2. Variations in $R_1$ are shown in the three di-ethers, it being respectively $-CH_2-$, $-C_6H_4-$ and $-CH_2CH_2-$. That is, $R_1$ may be phenylene or alkylene; both phenylene and $(CH_2)_x$ being specifically shown as illustrations of $R_1$; the *x* being shown as 1 or 2.

By varying the length of the alkylene groups and the number of ether groups, as shown ante, a series of ether-ester plasticizers may be obtained; the *x* being varied in the several alkylene groups shown for purposes of illustration. Further illustrations are given post and in some of them longer alkylene chains are shown, particularly in the terminal alkyl group, to wit, R. Such ether-esters may be also represented by the following formula:

$$H_3C-R_3-O-(-C_2H_4-O-)_m-R_1-\underset{\underset{O}{\parallel}}{C}-O-\underset{\underset{H}{\mid}}{\overset{\overset{H}{\mid}}{C}}-(CH_2)_n-CH_3$$

wherein *m* is 0 to 2, *n* is 4 to 16 and wherein $R_3$ and $R_1$ are alkylene groups. In the alkylene group $R_3$, forming a part of the terminal alkyl R, sometimes a short alkyl side chain is permissible. For instance, beta-*n*-propyl-beta-methyl-ethoxy acetic acid may be used. The short side chain in that acid is clearly shown in its structural formula which is as follows:

$$H_3C-CH_2-CH_2-\underset{\underset{H_3C}{\mid}}{\overset{\overset{H}{\mid}}{C}}-CH_2-O-CH_2-COOH$$

or $$H_3C-(CH_2)_x-\underset{\underset{H_3C}{\mid}}{\overset{\overset{H}{\mid}}{\underset{\mid}{C}}}-\overset{\overset{H_2}{\mid}}{C}-O-CH_2-COOH$$

Likewise, a simple ring (phenylene, etc.) is permissible as $R_3$. (See the use of cresoxy acetic acid, given post.)

These acids may all be prepared by the reaction of primary alcohols with metals, as for example sodium, to produce first sodium alcoholates which are subsequently reacted with halogenated acids. The mono-ether acids of class 1, of which normal butoxy acetic acid is a typical example, may be prepared as follows: About 23 grams of freshly cut metallic sodium are slowly and cautiously added to about 450 cc. anhydrous normal butanol contained in a suitable flask equipped with stirrer and reflux condenser and cooled to about 20° C. When the sodium has all dissolved, a solution of about 47.5 grams monochloracetic acid in about 50 cc. anhydrous butanol is slowly added, the temperature being maintained between 20 and 30° C. After the initial reaction is over, the mixture is heated to the refluxing temperature (about 110° C.) for about 90 minutes. The unreacted butanol is then removed by steam distillation and the water solution acidified by means of hydrochloric acid and cooled to zero degrees. The butoxy acetic acid is separated in the usual manner (weight of crude about 59.2 grams) and distilled in vacuo. The main fraction boils between about 139 and 144° C. at about 26 mm. pressure. The yield is about 37 grams. The boiling point at normal pressure is about 232.3 to 234.1° C.

The di- and tri-ether acids included in Classes 2, 3, 4 and 5 may be prepared by the methods outlined by Palomaa & Siitonen, Berichte, vol. 63 (1930) pages 3117-3120 inclusive. Cresoxy acetic acid is described in Beilstein, Third Edition, vol. 2, page 750.

The ether acids, so prepared, may be esterified with an appropriate monohydric alcohol of the type specified ante. Various higher alcohols, that is, those having a relatively high molecular weight, are appropriate and may be used.

By higher alcohols I allude to those alcohols beginning with normal hexanol $CH_3(CH_2)_4CH_2OH$ and extending to and including octadecanol $CH_3(CH_2)_{16}CH_2OH$. My preferred alcohol of this group is dodecanol (1) which is also described as normal dodecyl alcohol $CH_3(CH_2)_{10}CH_2OH$, vide Beilstein, 1918, vol. 1, page 428. This alcohol is also known as lauryl alcohol. Other typical alcohols which are all described in Beilstein, vol. 1, are normal tetradecyl alcohol, normal hexadecyl alcohol, normal decyl alcohol, normal octyl alcohol and octadecanol.

The following list gives the above alcohols and their formula in relation to the generic structure of the resulting ester:

1. Normal hexanol — $HO-CH_2-(CH_2)_4-CH_3$
2. Normal octyl alcohol — $HO-CH_2-(CH_2)_6-CH_3$
3. Normal decyl alcohol — $HO-CH_2-(CH_2)_8-CH_3$
4. Normal dodecyl alcohol (lauryl alcohol) — $HO-CH_2-(CH_2)_{10}-CH_3$
5. Normal tetradecyl alcohol — $HO-CH_2-(CH_2)_{12}-CH_3$
6. Normal hexadecyl alcohol — $HO-CH_2-(CH_2)_{13}-CH_3$
7. Normal octadecanol — $HO-CH_2-(CH_2)_{16}-CH_3$ These alcohols are of the class represented by the formula:

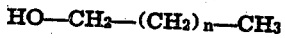

wherein $n$ is 4 to 16.

In the preparation of my esters I employ either the technical dodecyl alcohol or the mixture of alcohols resulting from the reduction of simple esters such as methyl or ethyl of the fatty acids from cocoanut oil. This reduction yields a mixture of alcohols which vary in constitution from hexanol to octadecanol.

The dodecyl ester of beta-n-butoxy-ethoxy acetic acid may be prepared as follows: 1 mol. of technical dodecanol, commercially known as lauryl alcohol, is mixed with 1¼ mols of beta-n-butoxy-ethoxy acetic acid in a suitable flask and 1 cc. concentrated sulfuric acid added. The mixture is heated in an oil bath at 120° C. under reduced pressure (20 millimeters) until all bubbling has ceased, which is usually about four hours. The liquid is then transferred to a Claisen distilling flask and approximately 5 grams of dry calcium carbonate added to neutralize any sulfuric acid remaining. It is then distilled in vacuo in the usual manner. The excess butoxy-ethoxy acetic acid distills over in the neighborhood of 160° C. at a pressure of 5 millimeters. The main fraction distills between 207–246° C. at a pressure of 4 to 6 millimeters. The product is a pale yellow liquid. This ester has the following formula:

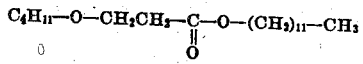

or

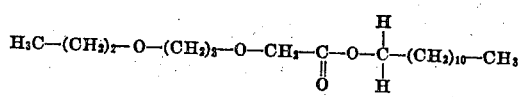

A mixture of esters may be prepared by starting with the mixture of alcohols resulting from the reduction of cocoanut oil fatty acids as above mentioned. This mixture is technically known as "Lorol". In this experiment I employed beta-n-butoxy-ethoxy acetic acid. 744 grams of lorol and 880 grams of butoxy-ethoxy acetic acid were mixed and 2 cc. concentrated sulfuric acid added in a suitable flask which was placed in an oil bath heated to 120° C. Reduced pressure was applied (approximately 20 millimeters) and heating was continued for about 10 hours until all bubbling had ceased. The material was then transferred to a Claisen distilling flask, about 10 grams dry calcium carbonate added and vacuum distillation was performed in the usual manner. The excess acid together with a small percentage of the low boiling esters came over in the beginning. The main fraction, however, distilled between 207–270° C. at 4 millimeters. The main fraction was 1100 grams and consisted of a pale yellow liquid.

The dodecanol ester of cresoxy acetic acid was prepared as follows: 88 grams of vacuum distilled cresoxy acetic acid were mixed with 130 grams of technical normal dodecyl alcohol and ½ cc. concentrated sulfuric acid added. This was placed in a suitable flask and heated under reduced pressure (approximately 20 millimeters) for 5 hours at 120° C. in an oil bath. The product was placed in a Claisen flask, an excess of dry barium carbonate added and the product vacuum distilled in the usual manner. The first fraction included everything coming over up to 240° C. at 18 millimeters. The main fraction distilled from 243–278° C. at 18 millimeters. This was a yellow liquid. This ester has the following formula

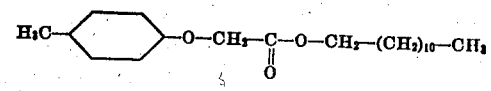

The dodecanol or lauryl ester of beta-n-propyl-beta-methyl-ethoxy acetic acid may be prepared as follows: 186 grams of technical lauryl alcohol, derived from cocoanut oil, were mixed with 199 grams of beta-n-propyl-beta-methyl-ethoxy acetic acid previously prepared after the method of Palomaa and Siitonen from commercial 2 methyl pentanol and chloracetic acid, and ½ cc. concentrated sulfuric acid added. The mixture was heated in a suitable flask in an oil bath at 120° C. under reduced pressure (20 millimeters) for approximately 5 hours until all bubbling had ceased. It was then transferred to a distilling flask and a small excess of barium carbonate added and the product distilled in vacuo. The main fraction distilled between 221 and 243° C. at 15 millimeters and amounted to 214 grams. This was a pale yellow liquid.

All the above esters are excellent solvents and plasticizers for nitrocellulose and may be used in the preparation of nitrocellulose lacquers and plastics. The dodecanol ester of beta-n-butoxy-ethoxy acetic acid is of particular value because of its high resistance to ultra violet light. This finds application in the preparation of white lacquers for refrigerator purposes and the like.

These esters are also very useful as plasticizers for cellulose acetate, cellulose ethers and for various natural and synthetic resins.

It will be readily apparent that many ether acid esters of higher alcohols can be prepared. For example, in the preparation of ether acids themselves much variation is possible. A wide variety of primary alcohols may be employed and various halogenated acids will react with the sodium alcoholates. The halogen may be present to the extent of one or more atoms in the halogenated acid and its position in the molecule while important is not required to be in any definite place. When the halogen acid used to prepare the ether acid contains more than one halogen atom, for instance, an acid containing two halogen atoms, the ether acid produced in that case will have the following formula:

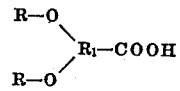

The sodium alcoholates may be prepared either from metallic sodium or from caustic soda. Other metallic alcoholates such as potassium, aluminum and the like may also be employed. In the choice of higher alcohols I am not restricted to any particular alcohol. It is, however, desirable if the products are to be used as plasticizers to choose those which yield with the ether acids, esters boiling in the neighborhood of 200° C. or above at reduced pressure such as 5 to 20 millimeters of mercury.

In effecting esterification I have found it convenient to use the method described but any other method suitable for the preparation of esters may also be employed and I am not to be limited as to the method of preparing my ether acid esters and I believe myself entitled to all similar compounds which come within the spirit and contemplation of my invention.

What I claim is:

1. As a new product, the dodecanol (1) ester of beta-n-butoxy-ethoxy acetic acid.

2. As a new product, the ester of beta-n-butoxy-ethoxy acetic acid derived from this acid and a primary alcohol containing not less than 6 nor more than 18 carbon atoms.

3. As new products useful as plasticizers, etc., the esters having the following formula:

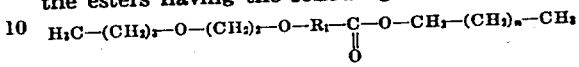

wherein $n$ is 4 to 16 and $R_1$ is a group selected from the class consisting of lower alkylene groups and phenylene groups.

4. As new products useful as plasticizers, etc., the esters having the following formula

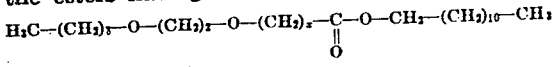

wherein $x$ is 1 to 2.

5. As new products useful as plasticizers, etc., the esters having the following formula:

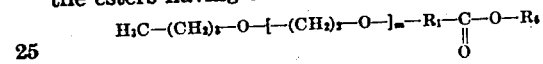

wherein $m$ is 1 to 2, $R_1$ represents a lower alkylene group and $R_4$ is a long alkyl radical, having a straight unbroken chain of $CH_2$ groups and containing between 6 and 18 carbon atoms, derived from a primary alcohol.

6. As new products useful in plasticizers, etc., the esters having the following formula:

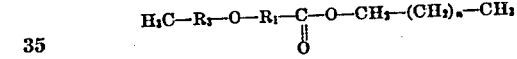

wherein $R_1$ is a lower alkylene group, $R_3$ is a group selected from the class consisting of a lower alkylene group and a phenylene group, and $n$ is from 4 to 16.

7. The ester having the following formula

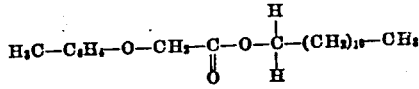

said ester being the dodecanol ester of cresoxy acetic acid.

8. As new products useful as plasticizers, etc., the esters having the following formula:

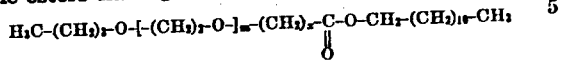

wherein $m$ is 1 to 2 and $x$ is 1 to 2, said esters being free of side chains.

9. As new products useful as plasticizers, etc., the ether-esters having the following formula

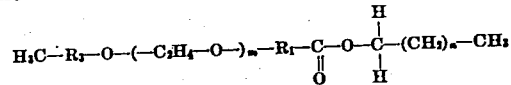

wherein $R_1$ represents a lower alkylene group, $R_3$ represents a member of the class consisting of alkylene and phenylene groups, $m$ is 0 to 2 and $n$ is 4 to 16.

10. As new products useful as plasticizers, etc., the esters having the following formula

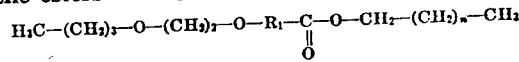

wherein $n$ is 4 to 16 and $R_1$ is a divalent hydrocarbon group of the class consisting of a lower alkylene group.

11. As new products useful as plasticizers, etc., the dodecanol esters of a di-ether carboxylic acid having the following formula:

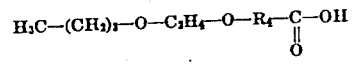

wherein $R_4$ is a group of the class consisting of $CH_2$, $C_2H_4$ and phenylene.

12. As new products useful as plasticizers, the dodecanol esters of ether acids having the following formula:

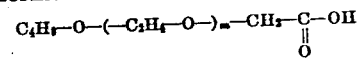

wherein $m$ is 0 to 2.

CLAYTON OLIN NORTH.